(12) United States Patent
Naito et al.

(10) Patent No.: US 8,670,067 B2
(45) Date of Patent: Mar. 11, 2014

(54) CAMERA APPARATUS INCLUDING SUPPORTING BLOCK WITH FILLING GROOVE FOR ADHESIVE AGENT

(75) Inventors: Jumpei Naito, Kanagawa (JP); Akihiro Miyazaki, Kanagawa (JP); Akihiro Nakamura, Saitama (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 12/827,103

(22) Filed: Jun. 30, 2010

(65) Prior Publication Data

US 2011/0032416 A1 Feb. 10, 2011

(30) Foreign Application Priority Data

Aug. 5, 2009 (JP) ................... 2009-182596

(51) Int. Cl.
*H04N 5/225* (2006.01)
*H04N 5/228* (2006.01)
*H04N 5/76* (2006.01)
*H04N 5/222* (2006.01)
*H03G 3/00* (2006.01)

(52) U.S. Cl.
USPC ............ 348/374; 348/208.14; 348/231.4; 348/333.12; 381/104

(58) Field of Classification Search
USPC ................................... 348/373, 374
See application file for complete search history.

(56) References Cited

U.S. PATENT DOCUMENTS

2007/0183773 A1* 8/2007 Aoki et al. ............ 396/529
2009/0079863 A1* 3/2009 Aoki et al. ............ 348/374

FOREIGN PATENT DOCUMENTS

JP 2007-225991 9/2007

* cited by examiner

*Primary Examiner* — Joel Fosselman
(74) *Attorney, Agent, or Firm* — Oblon, Spivak, McClelland, Maier & Neustadt, L.L.P.

(57) ABSTRACT

Disclosed herein is a camera apparatus, including: a lens block having an image capturing lens provided therein; a substrate having an image pickup element mounted thereto; a housing for accommodating therein the lens block and the substrate; and a supporting block for supporting the substrate so that the image pickup element and the image capturing lens face each other by bonding thereto the substrate by using an adhesive agent, wherein the supporting block has a side surface making a right angle with an adhesion surface to which the substrate is bonded, and a bottom surface parallel with the adhesion surface on the adhesion surface, and a filling groove which is filled with the adhesive agent is formed in the supporting block.

16 Claims, 15 Drawing Sheets

CAMERA APPARATUS INCLUDING SUPPORTING BLOCK WITH FILLING GROOVE FOR ADHESIVE AGENT

BACKGROUND OF THE INVENTION

1. Field of the Invention

The present invention relates to a camera apparatus, and more particularly to a camera apparatus which is suitably used as an on-board camera mounted to a vehicle for the purpose of enhancing convenience and safety of an automobile.

2. Description of the Related Art

Heretofore, a camera apparatus mounted to a vehicle main body for carrying out visual contact by using a monitoring device installed in the vicinity of a cockpit has been provided for the purpose of enhancing convenience and safety of an automobile. This sort of camera apparatus includes an approximately rectangular housing having an image capturing lens and an image pickup element incorporated therein. Also, the housing is either built in or attached to a rear door, a side mirror, a front spoiler, or the like of a vehicle main body so that the image capturing lens is made to face the outside. In accordance with such a camera apparatus, an image of the circumference of a vehicle becoming a blind angle for a driver can be displayed, and thus the safety and the convenience can be enhanced.

Now, it is difficult to make this sort of camera apparatus to be harmony with a design for an exterior appearance of an automobile in many cases. Thus, it is desirable that this sort of camera apparatus is inconspicuous in terms of the exterior appearance as much as possible. In addition, when the housing is largely exposed to the outside, the danger that the housing comes in contact with the outside in a phase of car wash, in a phase of opening/closing of a door, in a phase of travel motion, or in a phase of parking increases. This is not preferable in terms of prevention of breakage, and prevention of contamination of the image capturing lens. For this reason, the camera apparatus is required to be further miniaturized.

Here, in general, the camera apparatus used as the on-board camera includes the housing and a substrate. In this case, the housing is formed into an approximately rectangular shape, and an image capturing lens block is either fitted to or fixed integrally with the housing. An image pickup element such as a CCD (Charge Coupled Device) is mounted to the substrate. Also, the substrate is fixed within the housing so that the image pickup element and the image capturing lens face each other, thereby forming the camera apparatus. The housing is composed of an upper half and a lower half. After the substrate is fixed to the inside of one half having the image capturing lens, one half is coupled to the other half. The fixing of the substrate to one half is carried out by using an adhesive agent or screws. The focusing adjustment for the lens is precisely required as the image pickup element mounted to the substrate has a larger number of pixels. Thus, after completion of the focusing adjustment, the substrate is fixed to one half by using fixing means such as the adhesive agent or the screws.

For the purpose of holding a positional relationship between the image capturing lens and the image pickup element, the considerable strength is required for the fixing of the substrate to one half. In particular, the camera apparatus used as the on-board camera needs to have a resistance property against a shock in the phase of the opening/closing of the door, and in the phase of the travel motion. In addition, the automobile is exposed to all temperature environments from a high-temperature environment to a low-temperature environment, and thus the on-board camera is also exposed to the high-temperature environment together with a vehicle interior and a body. Under such a high-temperature environment, it is necessary for the on-board camera to maintain an adhesion force of the substrate to one half.

For more information, refer to Japanese Patent Laid-open No. 2007-225991.

SUMMARY OF THE INVENTION

However, when the fixing by using the adhesive agent is strongly carried out, an application area for the adhesive agent needs to be ensured over the entire periphery along an outer edge of the substrate. Thus, when the mounting area for the image pickup element and the like is taken into consideration, the substrate is caused to be increased in size. In addition, in the case as well where the substrate is screwed on one half, when an insertion area of the screw is provided in a plurality of portions, the substrate is similarly increased in size. Also, along with the increase in size of the substrate, the housing is caused to be made large.

The present invention has been made in order to solve the problems described above, and it is therefore desirable to provide a camera apparatus which can be entirely miniaturized while a strength of adhesion between a substrate and a housing is ensured.

In order to attain the desire, according to an embodiment of the present invention, there is provided a camera apparatus including: a lens block having an image capturing lens provided therein; a substrate having an image pickup element mounted thereto; a housing for accommodating therein the lens block and the substrate; and a supporting block for supporting the substrate so that the image pickup element and the image capturing lens face each other by bonding thereto the substrate by using an adhesive agent. In the camera apparatus, the supporting block has a side surface making a right angle with an adhesion surface to which the substrate is bonded, and a bottom surface parallel with the adhesion surface on the adhesion surface, and a filling groove which is filled with the adhesive agent is formed in the supporting block.

According to another embodiment of the present invention, there is provide a camera apparatus including: an image capturing lens; a substrate having an image pickup element mounted thereto; a housing for accommodating therein the substrate, the image capturing lens being incorporated in the housing; and a supporting block for supporting the substrate so that the image pickup element and the image capturing lens face each other by bonding thereto the substrate by using an adhesive agent, the supporting block being formed in the housing. In the camera apparatus, the supporting block has a side surface making a right angle with an adhesion surface to which the substrate is bonded, and a bottom surface parallel with the adhesion surface on the adhesion surface, and a filling groove which is filled with the adhesive agent is formed in the supporting block.

As set forth hereinabove, according to the present invention, the adhesive force of the substrate can be strengthened by a shear stress acting on the side surface of the filling groove, and a tension stress against the peeling-off of the bottom surface. Therefore, even when the camera apparatus is exposed to the high-temperature environment, the adhesion strength of the substrate can be maintained, and thus the substrate can be prevented from being peeled off from the supporting block.

DETAILED DESCRIPTION OF THE PREFERRED EMBODIMENT

Hereinafter, a camera apparatus according to an embodiment of the present invention will be described in detail with reference to the accompanying drawings. It is noted that the description will be given below in accordance with the following order.

1. Housing 10
2. Image capturing lens block 11
3. Supporting block 23
4. Substrate 13

1. Housing 10

Figure 1:
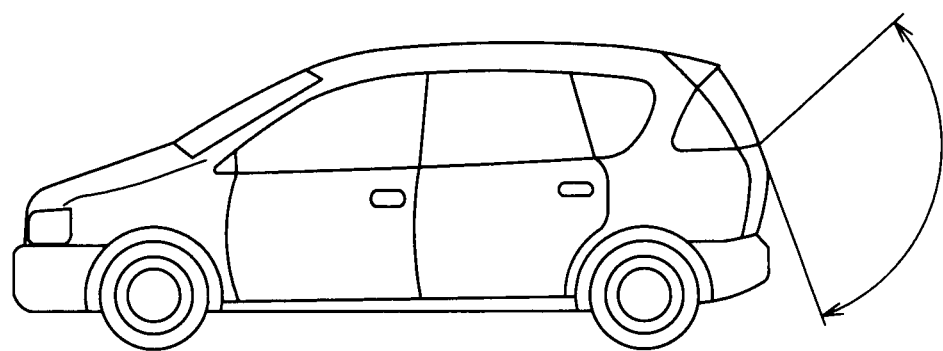
FIG. 1 is a side elevational view showing a state in which a camera apparatus according to an embodiment of the present invention is used as an on-board camera.
Figure 2:
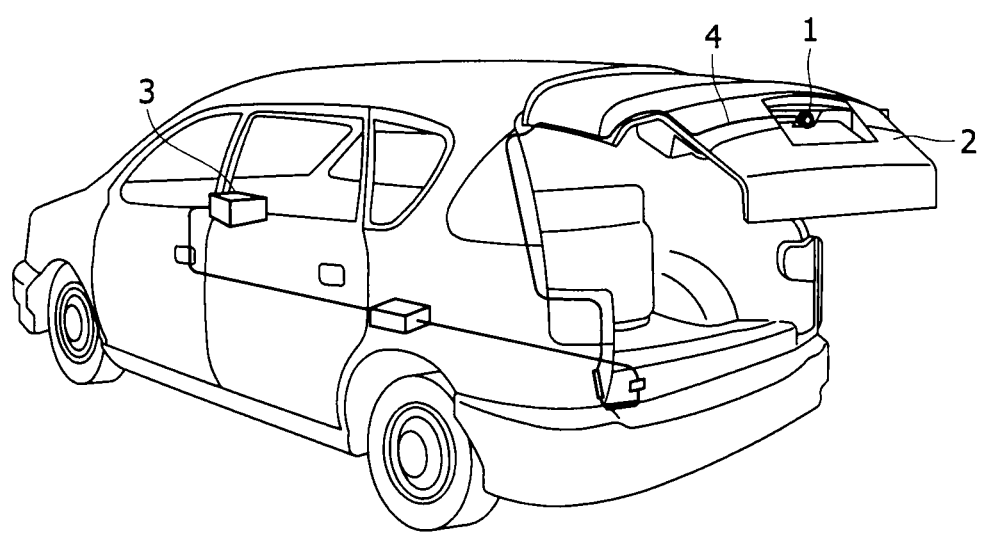
FIG. 2 is a perspective view showing another state in which a back door is opened in an automobile including the camera apparatus according to the embodiment of the present invention used as the on-board camera.
Figure 3:
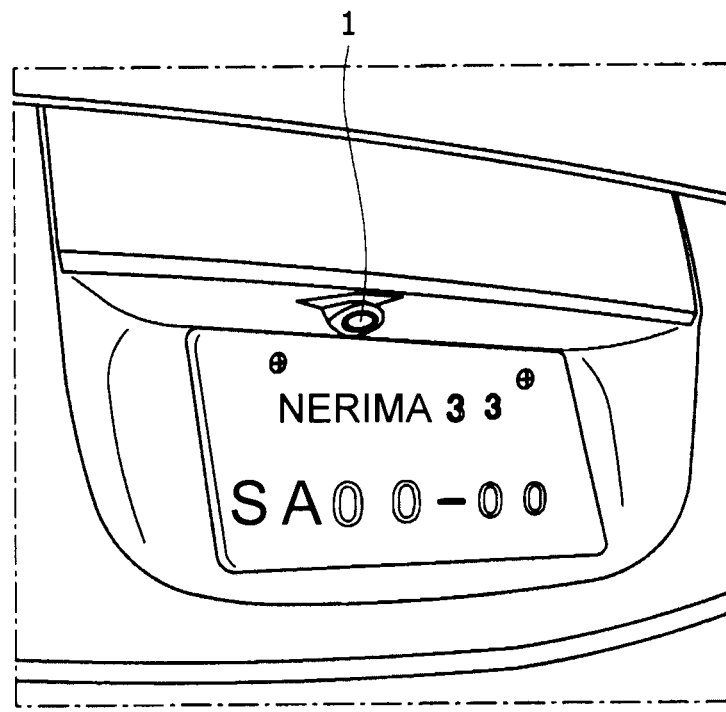
FIG. 3 is a perspective view showing an installation state of the camera apparatus according to the embodiment of the present invention.

A camera apparatus 1 according to an embodiment of the present invention, as shown in FIG. 1, is used as a rear monitor which, for example, is provided in a rear portion of a vehicle body of an automobile, and which serves to display an image of a rearward of the vehicle body. The camera apparatus 1, as shown in FIGS. 2 and 3, is mounted approximately at a center of a back door 2, and is connected to a navigation system 3 or the like. Thus, the camera apparatus 1 can display an image of the rearward of the vehicle body on a monitor provided either in a dashboard or in an instrument panel on a driver's seat side. It is noted that the camera apparatus 1 may be mounted to the front portion, of the vehicle body, such as a front grille or a lower portion of a number plate, thereby displaying a right and left blind angle for a driver in front of the vehicle body. In addition, the camera apparatus 1 may be mounted to a lower portion of a side mirror, thereby displaying an image about a blind angle for the driver on a side of the vehicle body.

Figure 4A:
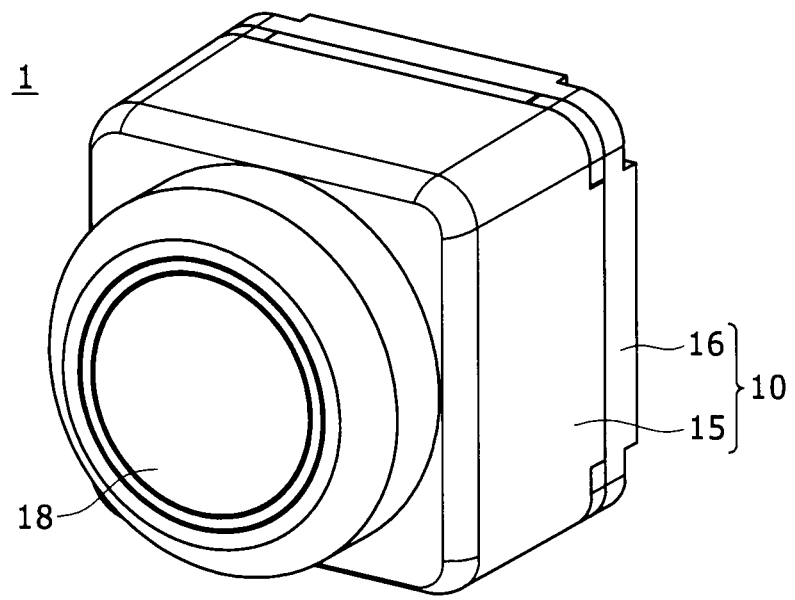
FIGS. 4A and 4B are respectively a perspective view showing a front surface side of the camera apparatus of the embodiment, and a perspective view showing a back surface side of the camera apparatus of the embodiment.
Figure 4B:
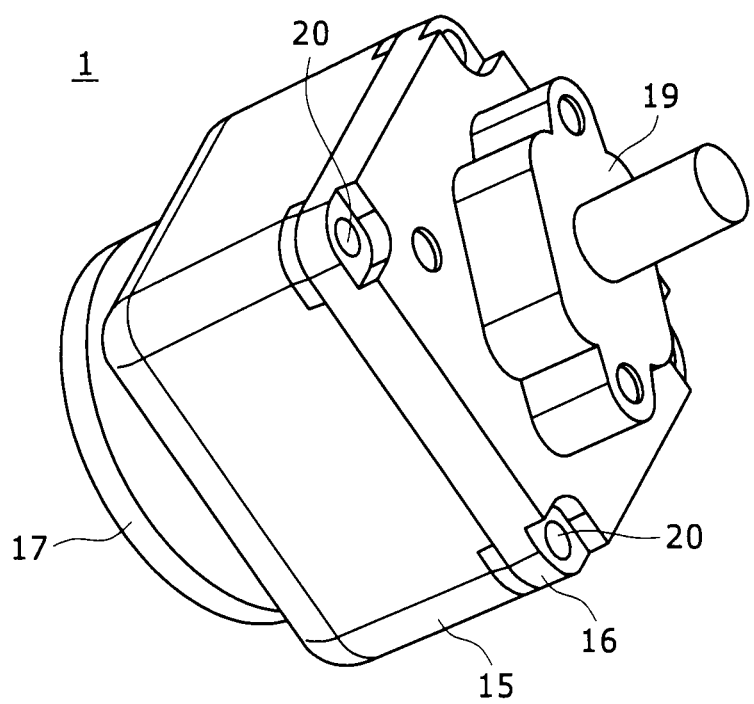
Figure 5:
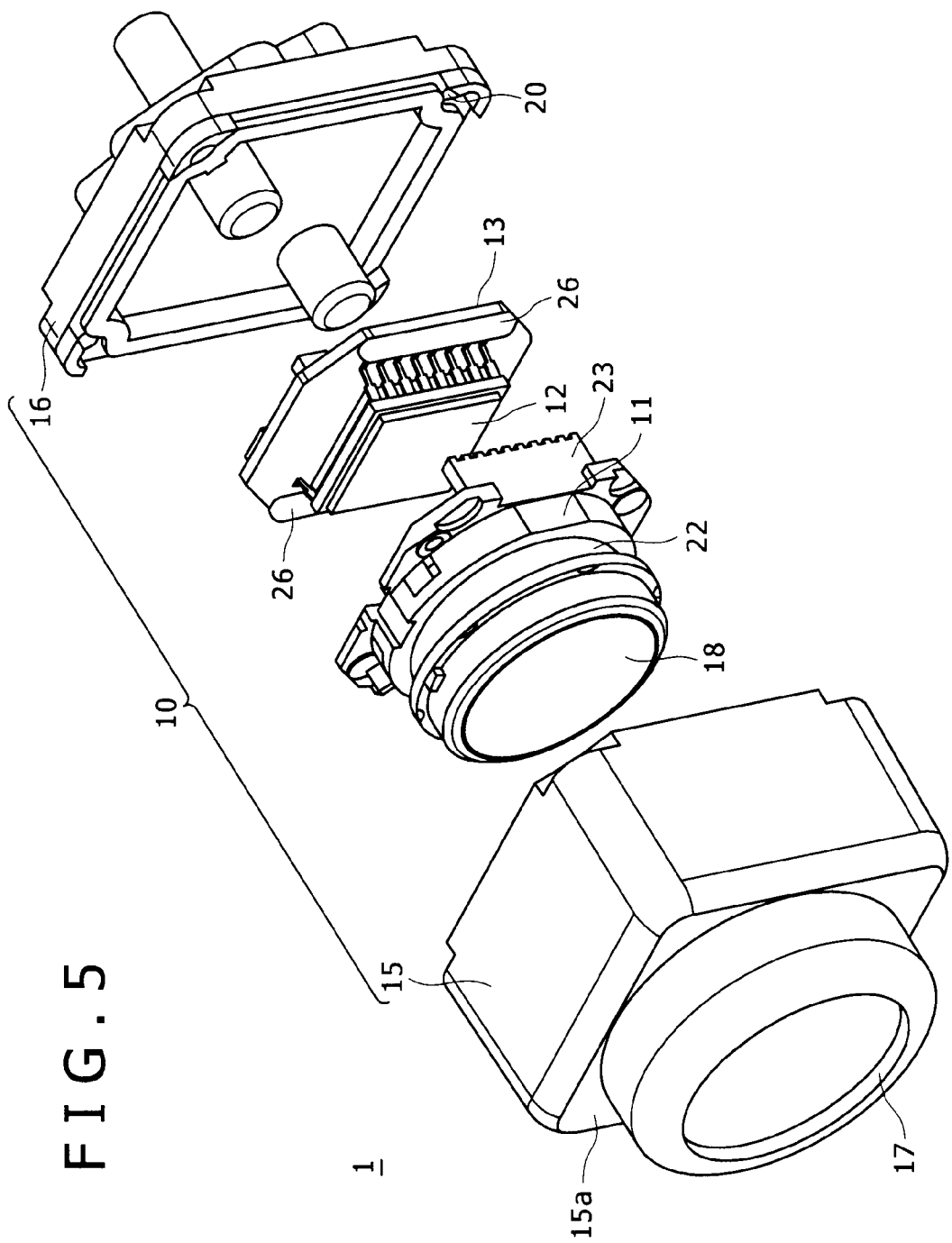
FIG. 5 is an exploded perspective view of the camera apparatus of the embodiment.

As shown in FIGS. 4A and 4B, and 5, the camera apparatus 1 includes an approximately rectangular housing 10, an image capturing lens block 11 incorporated in the housing 10, an image pickup element 12 such as a CCD or a CMOS (Complementary Metal Oxide Semiconductor), and a substrate 13. In this case, the image pickup element 12 captures an image corresponding to a light made incident thereto through an image capturing lens 18. The substrate 13 has the image pickup element 12 mounted thereto, and is fixed to the inside of the housing 10.

An upper half 15 and a lower half 16 paired with each other are coupled to each other in an abutment manner, thereby forming the housing 10. Each of the upper half 15 and the lower half 16 is molded into an approximately rectangular shape from an engineer plastic or the like. As shown in FIG. 5, the image capturing lens block 11 is fitted to the inside of the upper half 15, and a circular lens opening portion 17 is formed approximately at a center of a principal surface 15a of the upper half 15. Also, when the image capturing lens block 11 is fitted to the inside of the upper half 15, the upper half 15 causes the image capturing lens 18 provided in the image capturing lens block 11 to face the outside through the circular lens opening portion 17. A jack portion 19 with which a connector cable 4 is engaged is formed on a lower surface of the lower half 16. Screw holes 20 are formed in corners, of the upper and lower halves 15 and 16, facing each other. Thus, the upper and lower halves 15 and 16 are made to abut with each other, whereby these screw holes 20 become continuous. Thus, the screws are inserted into the respective screw holes 20, thereby coupling the upper and lower halves 15 and 16 to each other.

2. Image Capturing Lens Block 11

The image capturing lens block 11 which is fitted to the upper half 15 includes the image capturing lens 18, a mount portion 22 for supporting the image capturing lens 18, and a supporting block 23. In this case, the supporting block 23 is erected on the mount portion 22, and supports the substrate 13 which will be described later. The image capturing lens 18, for example, is composed of a plastic lens and is mounted to the mount portion 22. The mount portion 22 has an exterior shape which can be fitted to the inside of the upper half 15. In addition, the supporting block 23 for supporting the substrate 13 is erected on the mount portion 22 on the lower half 16 side.

It is noted that the image capturing lens block 11 may be integrated with the upper half 15 in addition to the case where the image capturing lens block 11 is fitted to the upper half 15. In this case as well, similarly, the image capturing lens block 11 has a construction including the supporting block 23.

3. Supporting Block 23

The supporting block 23 is fixed to the substrate 13, whereby the image pickup element 12 mounted to the substrate 13, and the image capturing lens block 11 fitted to the upper half 15 are made to face each other. Thus, the supporting block 23 holds a state in which the focusing adjustment for the image capturing lens block 11 is precisely carried out.

Figure 6:
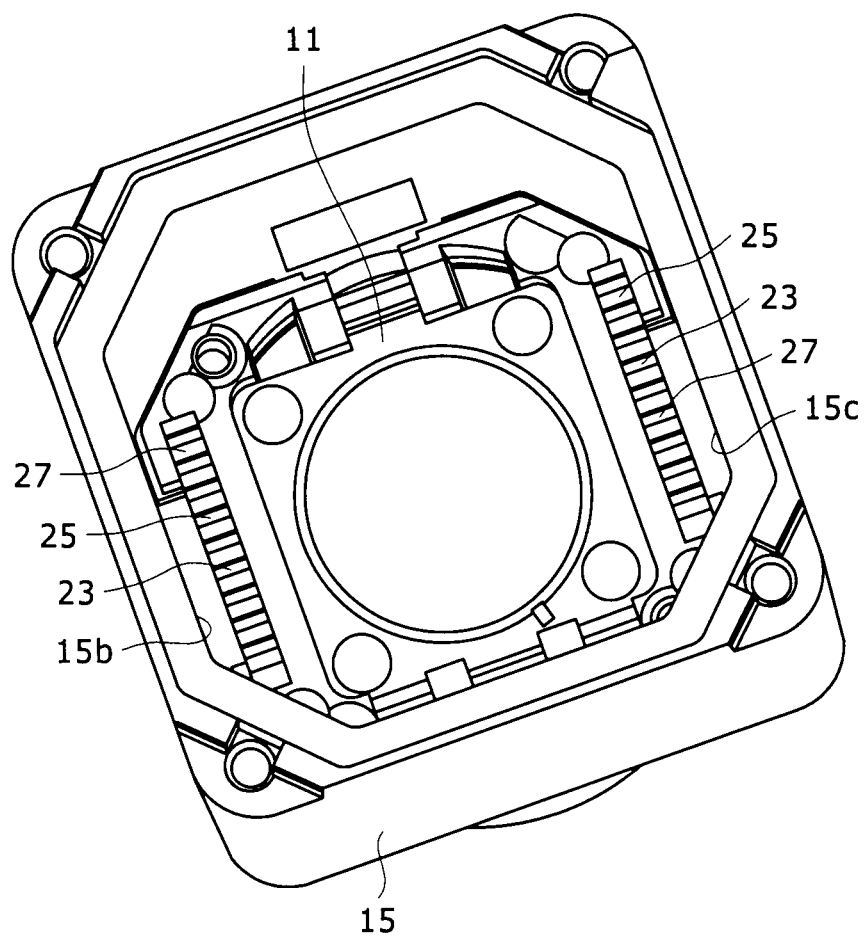
FIG. 6 is a perspective view showing an upper half, of the camera apparatus of the embodiment, into which an image capturing lens block is fitted.
Figure 7:
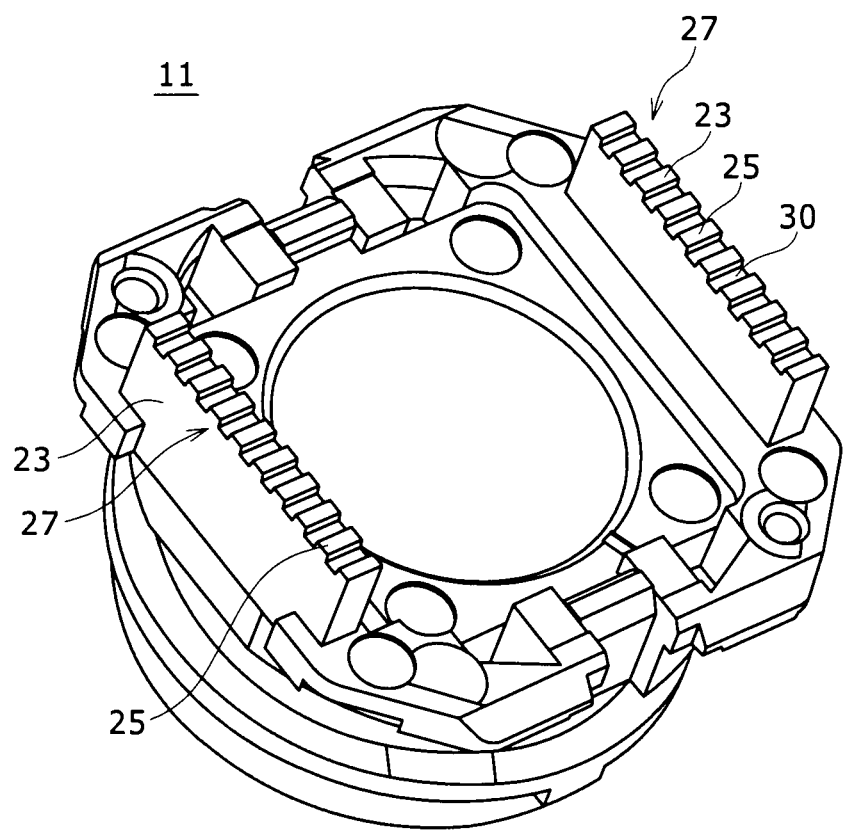
FIG. 7 is a perspective view showing the image capturing lens block shown in FIG. 6.

The supporting block 23 has a shape allowing the supporting block 23 to be bonded along an outer edge portion of the substrate 13. For example, the supporting block 23 has a rectangular parallelepiped-like shape so as to be bonded along the outer edge portion of the substrate 13 formed into the approximately rectangular shape. In addition, as shown in FIGS. 6 and 7, the supporting blocks 23 paired with each other are firmed so as to face each other. Also, the image capturing lens block 11 to which the substrate 13 is fixed is fitted to the upper half 15, whereby the paired supporting blocks 23 are erected on the mount portion 22 along paired sidewalls 15b and 15c of the upper half 15 facing each other.

Figure 8:
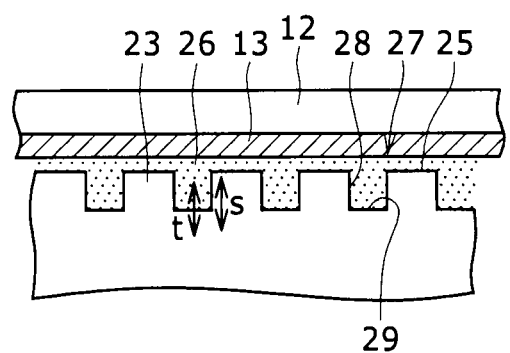
FIG. 8 is a cross sectional view showing a state in which a substrate is bonded to a supporting block.

In the supporting block 23, filling grooves 27 each of which is filled with an adhesive agent 26 for bonding of the substrate 13 are formed in an adhesion surface 25 to which the outer edge portion of the substrate 13 is bonded. As shown in FIG. 8, each of the filling grooves 27 has a side surface 28 making at a right angle with the adhesion surface 25, and a bottom surface 29 parallel with the adhesion surface 25. The adhesive agent 26 applied to the substrate 13 is filled in each of the filling grooves 27 and is then cured, whereby the substrate 13 is fixed to the supporting block 23 through the adhesive agent 26. At this time, when an external force for peeling off the substrate 13 from the supporting block 23 acts on the substrate 13, as shown in FIG. 8, in the supporting block 23, a shear stress, s, acts on each of the side surfaces 28 of the filling grooves 27, and also a tension stress, t, against the peeling-off acts between each of the bottom surfaces 29 of the filling grooves 27, and the supporting block 23. In such a manner, not only the tension stress, t, but also the shear stress, s, acts, whereby the supporting block 23 can strengthen the adhesion force of the substrate 13. In a general adhesive agent, an adhesion force of an interface is decreased under the high-temperature environment. However, even when the camera apparatus 1 is exposed to the high-temperature environment, the adhesion strength of the substrate 13 can be maintained, and thus the substrate 13 can be prevented from being peeled off from the supporting block 23.

As shown in FIG. 7, for example, in the filling grooves 27, a plurality of transverse groove portions 30 each making a right angle with a longitudinal direction of the supporting block 23 are provided in the adhesion surface 25 along the longitudinal direction of the supporting block 23. Each of the transverse groove portions 30 has the side surface 28 making a right angle with the adhesion surface 25, and the bottom surface 29 parallel with the adhesion surface 25. By providing such transverse groove portions 30 in the adhesion surface 25, the supporting block 23 can strengthen the adhesion surface of the substrate 13 by the shear stress, s, acting on each of the side surfaces 28 in addition to the tension stress, t, against the peeling-off of each of the bottom surfaces 29.

Figure 9A:
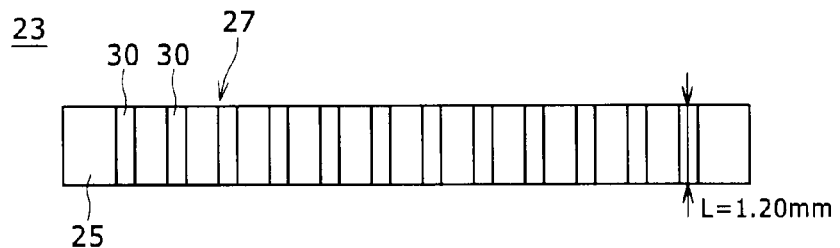
FIGS. 9A and 9B are respectively a top plan view of the supporting block shown in FIG. 8, and a side elevational view of the supporting block shown in FIG. 8.
Figure 9B:
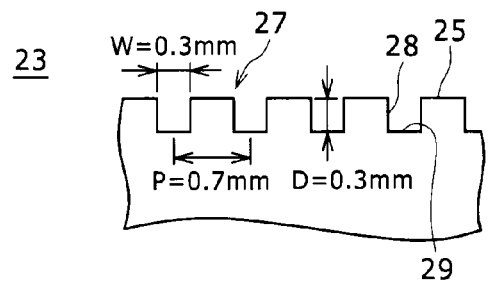

Here, exemplifying a size of the transverse groove portion 30, as shown in FIGS. 9A and 9B, a length L corresponding to a width of the supporting block 23 is 1.2 mm (refer to FIG. 9A), a width W is 0.3 mm, a depth D is 0.3 mm, and a pitch P of the transverse groove portions 30 is 0.7 mm (refer to FIG. 9B).

Figure 10A:
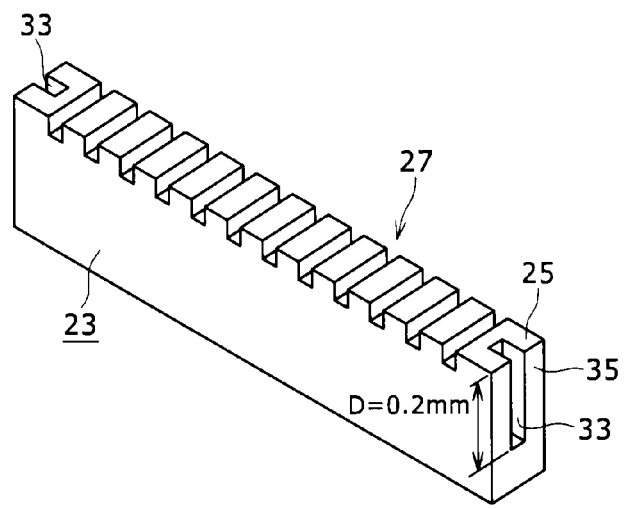
FIGS. 10A and 10B are respectively a perspective view showing a first change of the supporting block, and a top plan view of the first change of the supporting block shown in FIG. 10A.
Figure 10B:
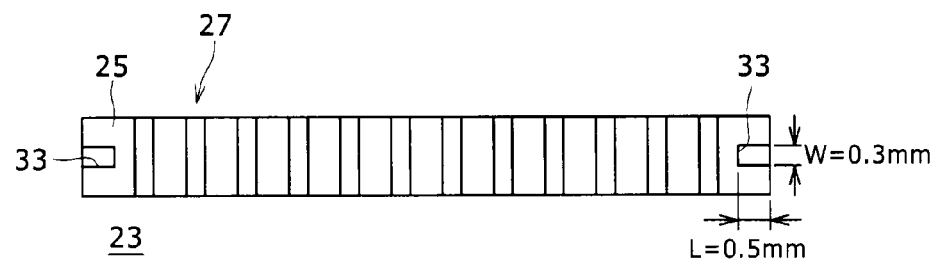

In addition, in the supporting block 23, as shown in FIGS. 10A and 10B, a deep groove portion 33 which is formed more deeply than each of other portions (such as the transverse groove portions 30) may be provided in each of portions on which the external force for peeling off the substrate 13 is concentrated. While each of the transverse groove portions 30 has the depth D of 0.3 mm, each of the deep groove portions 33 has a larger depth of, for example, 2 mm. By providing the deep groove portions 33, the shear stress, s, more strongly acts on each of the deep groove portions 33 because the shear surface is increased in each of the deep groove portions 33 of the supporting block 23. Therefore, in the supporting block 23, the deep groove portions 33 are respectively formed in the portions on each of which the external force for peeling off the substrate 13 is concentrated, whereby the adhesion force can be increased as compared with the case of each of other shallow transverse groove portions 30, and thus the substrate 13 can be prevented from being peeled off from the supporting block 23. It is noted that each of the deep groove portions 33 is formed more deeply than each of the transverse groove portions 30, whereby when the adhesive agent 26 is applied to the substrate 13, bubbles can be made to be easily vented in a deep direction through an opened side surface.

Since the stress for peeling off the substrate 13 from the supporting block 23 is easy to concentrate on the outer edge portion of the substrate 13, as shown in FIGS. 10A and 10B, the deep groove portions 33 are respectively formed in both end portions, in the longitudinal direction of the supporting block 23, on each of which the stress for peeling off the substrate 13 from the supporting block 23 is concentrated. Each of the deep groove portions 33 is formed in parallel with the longitudinal direction of the supporting block 23, and is also formed from the adhesion surface 25 to a side surface 35 of the supporting block 23. Exemplifying a size of each of the deep groove portions 33, a length L parallel with the longitudinal direction of the supporting block 23 is 0.5 mm, a width W making at a right angle with the length L direction is 0.3 mm, and a depth D is 2 mm.

It is noted that the portions in which the deep groove portions 33 are respectively formed are not necessarily limited to the both end portions of the supporting block 23 as long as the portions of formation of the deep groove portions 33 are portions on each of which the stress for peeling off the substrate 13 from the supporting block 23 is concentrated. The stress for peeling off the substrate 13 from the supporting block 23 is concentrated on a bonding boundary portion between the substrate 13 and the supporting block 23. For example, when the outer edge portion of the substrate 13 is shorter than the supporting block 23, the deep groove portions 33 may be respectively formed in portions on which the both sides of the outer edge portion of the substrate 13 are bonded, respectively. On the other hand, when the outer edge portion of the substrate 13 is longer than the supporting block 23, as shown in FIGS. 10A and 10B, the deep groove portions 33 may be respectively formed in the both end portions in the longitudinal direction of the supporting block 23.

In addition, all it takes is that each of the deep groove portions 33 is deeper than any of other portions (such as the transverse groove portions 30), and thus the depth of each of the deep groove portions 33 is suitably selected depending on the viscosity, the adhesion strength and the like of the adhesive agent 26 filled in each of the deep groove portions 33. Moreover, not only the deep groove portions 33, as shown in FIGS. 10A and 10B, are formed as the longitudinal grooves parallel with the longitudinal direction of the supporting block 23, but also the deep groove portions 33 may be formed as transverse grooves each making at a right angle with the longitudinal direction of the supporting block 23.

Figure 11:
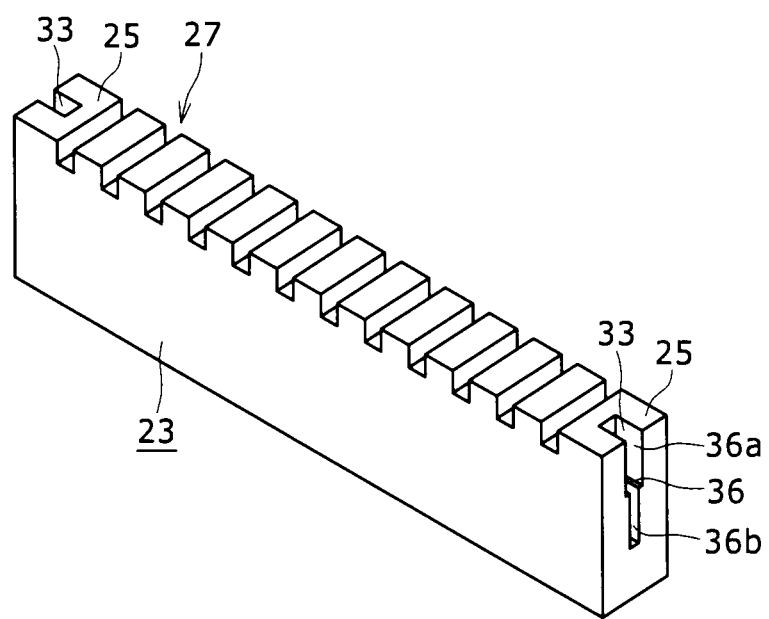
FIG. 11 is a perspective view showing a second change of the supporting block in which a stepped portion is provided in each of deep groove portions.

In addition, as shown in FIG. 11, by providing a stepped portion 36 in each of the deep groove portions 33, a wide portion 36a may be formed in an upper portion of the supporting block 23, and a narrow portion 36b may be formed in a lower portion of the supporting block 23. By providing the wide portion 36a and the narrow portion 36b from the upper portion to the lower portion of the supporting block 23, the adhesive agent 26 is easily filled up to the lower portion of each of the deep groove portions 33 through the capillary action, and thus the shear surface can be efficiently increased.

Figure 12A:
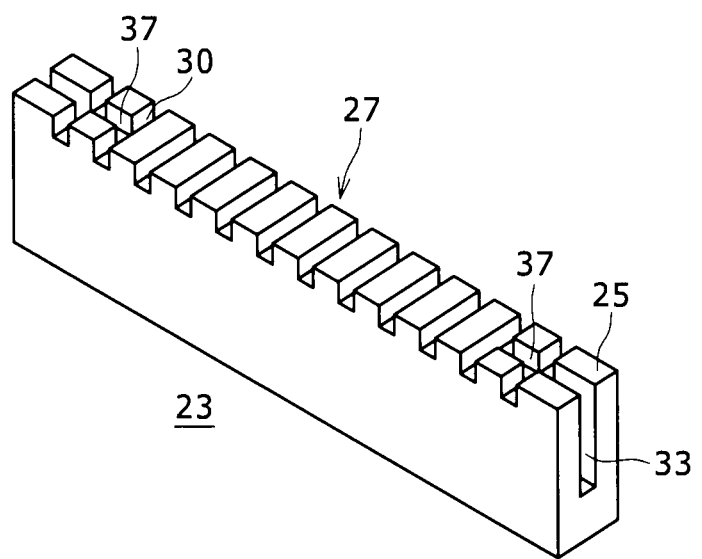
FIGS. 12A and 12B are respectively a perspective view showing a third change of the supporting block in which longitudinal groove portions are provided in both ends in the longitudinal direction, respectively, and a top plan view showing the third change of the supporting block shown in FIG. 12A.
Figure 12B:
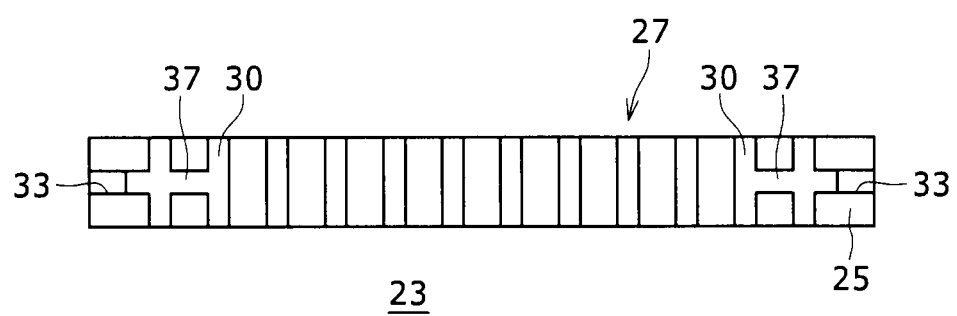

In addition, for the filling grooves 27, as shown in FIGS. 12A and 12B, longitudinal groove portions 37 each being parallel with the longitudinal direction of the supporting block 23 may also be formed in addition to the formation of the transverse groove portions 30 described above. By forming the longitudinal groove portions 37, areas of the side surfaces 28 of the filling grooves 27 each contacting the adhesive agent 26 are increased. Therefore, the shear stress, s, acting on each of the side surfaces 28 of the filling grooves 27 is strengthened. Therefore, by providing the longitudinal groove portions 37 in the supporting block 23 in addition to the transverse groove portions 30, the adhesion force of the substrate 13 can be further increased as compared with the case where only the transverse groove portions 30 are formed in the supporting block 23.

Note that, the filling grooves 27 include the transverse groove portions 30 each facing the side surface in a transverse direction of the supporting block 23, and further include the longitudinal groove portions 37. As a result, in the phase of filling of the adhesive agent 26, the bubbles become easy to vent through the transverse groove portions 30 each extending in the transverse direction, and thus it is possible to prevent a situation in which the bubbles remain within the adhesive agent 26.

As shown in FIGS. 12A and 12B, such longitudinal groove portions 37 may be formed only on the both end sides in the longitudinal direction of the supporting block 23. As described above, the both end portions in the longitudinal direction of the supporting block 23 are the portions on each of which the stress for peeling off the substrate 13 from the supporting block 23 is easy to concentrate. Therefore, the provision of the longitudinal groove portions 37 in the filling grooves 27 makes it possible to increase the adhesion force of the substrate 13 and thus to prevent the substrate 13 from being peeled off from the supporting block 23.

In addition, in the filling grooves 27, the longitudinal groove portions 37 formed in the both end portions in the longitudinal direction of the supporting block 23, respectively, may also be respectively formed as the deep groove portions 33 each of which is more deeply formed than each of other portions (such as the transverse groove portions 30). By forming the longitudinal groove portions 37 as the deep groove portions 33, respectively, the shear surface can be increased in each of the deep groove portions 33, and thus the shear stress more strongly acts on each of the side surfaces 28 of the filling grooves 27. Therefore, in the filling grooves 27, the adhesion force of the substrate 13 can be further increased in the both end portions on each of which the stress for peeling off the substrate 13 from the supporting block 23 is easy to concentrate.

Figure 13A:
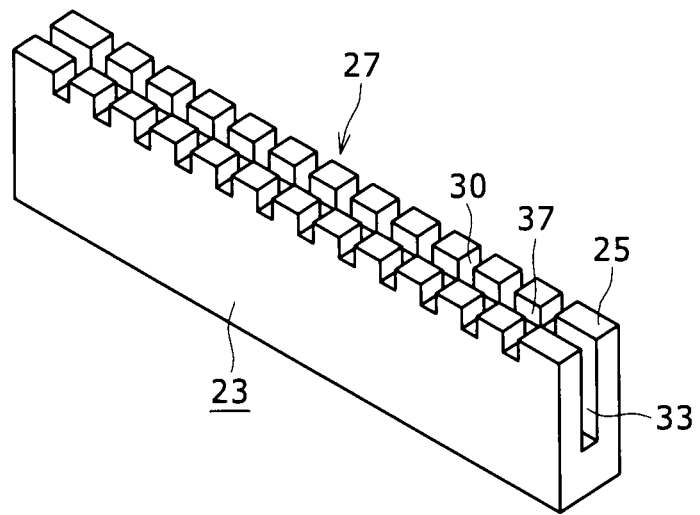
FIGS. 13A and 13B are respectively a perspective view showing a fourth change of the supporting block in which a longitudinal groove portion is provided over the entire length in the longitudinal direction, and a top plan view showing the fourth change of the supporting block shown in FIG. 13A.
Figure 13B:
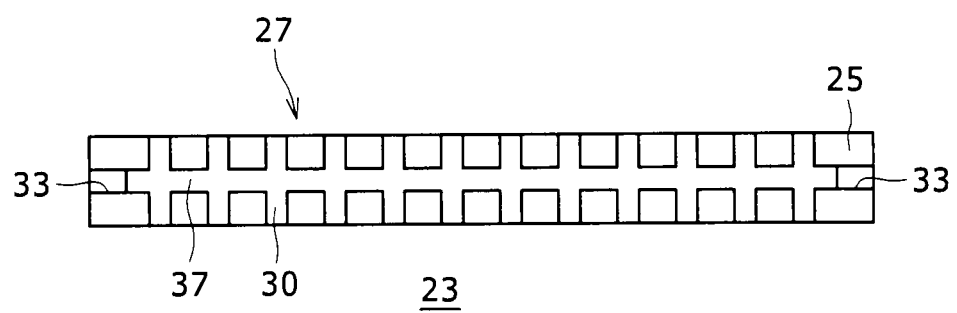

In addition, the longitudinal groove portion 37, as shown in FIGS. 13A and 13B, may also be formed over the entire length in the longitudinal direction of the supporting block 23. The longitudinal groove portion 37 is formed over the entire length in the longitudinal direction of the supporting block 23, whereby the areas of the side surfaces 28 each contacting the adhesive agent 26 are largely increased. As a result, in the supporting block 23, the adhesion force of the substrate 13 can be increased over the entire length in the longitudinal direction of the supporting block 23, and thus the substrate 13 can be prevented from being peeled off from the supporting block 23 even when the stress is concentrated on any of the portions.

In addition, in the supporting block 23 as well shown in FIGS. 13A and 13B, the longitudinal groove portions 37 formed in the both end portions in the longitudinal direction of the supporting block 23, respectively, may also be respectively formed as the deep groove portions 33 each of which is more deeply formed than each of other portions (such as the transverse groove portions 30). By forming the longitudinal groove portions 37 as the deep groove portions 33, respectively, the shear surface can be increased in each of the deep groove portions 33, and thus the shear stress more strongly acts on each of the side surfaces 28 of the filling grooves 27. As a result, in the supporting block 23, the adhesion force of the substrate 13 can be further increased in the both end portions on each of which the stress for peeling off the substrate 13 from the supporting block 23 is easy to concentrate.

Figure 14:
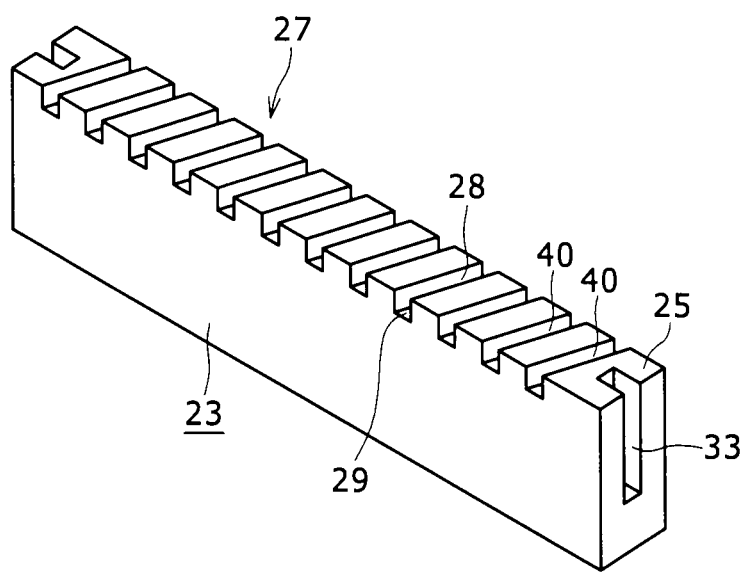
FIG. 14 is a perspective view showing a fifth change of the supporting block in which oblique groove portions are provided.

In addition, in the filling grooves 27, as shown in FIG. 14, a plurality of oblique groove portions 40 each extending obliquely with respect to the longitudinal direction of the supporting block 23 may also be formed in the longitudinal direction of the supporting block 23. Each of the oblique groove portions 40 is a groove portion extending obliquely with respect to the longitudinal direction of the supporting block 23, and thus includes the side surface 28 and the bottom surface 29 similarly to the case of each of the transverse groove portions 30 described above.

Therefore, by forming the oblique groove portions 40 in the supporting block 23, the shear stress acts on each of the side surfaces 28 of the filling grooves 27, and also the tension stress against the peeling-off acts between each of the bottom surfaces 29 of the filling grooves 27, and the supporting block 23. In addition, by forming the oblique groove portions 40 in the supporting block 23, the supporting block 23 can have the resistance property against any of the stress applied in the longitudinal direction of the supporting block 23, and the stress applied in the direction making at a right angle with the longitudinal direction of the supporting block 23 and parallel with each of the adhesion surfaces 25.

It is noted that although each of the oblique groove portions 40 makes at an angle of, for example, 45° with the longitudinal direction of the supporting block 23, this angle can be suitably changed. In addition, as shown in FIG. 14, with regard to the filling grooves 27, in addition to the oblique groove portions 40, the deep groove portions 33 may also be respectively provided in the both end portions in the longitudinal direction of the supporting block 23.

Figure 15:
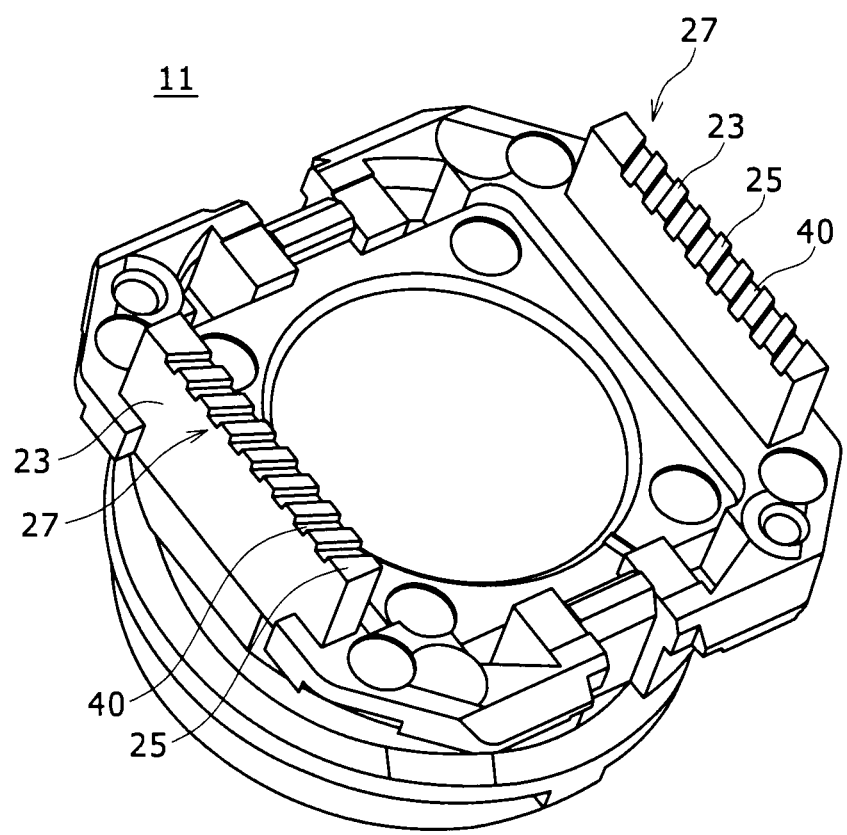
FIG. 15 is a perspective view showing a sixth change of the supporting block in which an oblique direction of the oblique groove portions of one supporting block, and an oblique direction of the oblique groove portions of the other supporting block are made opposite to each other.

In addition, as shown in FIG. 15, the oblique direction of the oblique groove portions 40 with respect to the longitudinal direction of one supporting block 23 may be made opposite to that of the oblique groove portions 40 with respect to the longitudinal direction of the other supporting block 23. The oblique direction of the oblique groove portions 40 with respect to the longitudinal direction of one supporting block 23 is made opposite to that of the oblique groove portions 40 of the other supporting block 23, whereby even when the stress is applied in the direction parallel with the oblique direction of the oblique groove portions 40 with respect to any one of one supporting block 23 and the other supporting block 23, the oblique groove portions 40 formed in any one of one supporting block 23 and the other supporting block 23 can have the resistance property against the stress applied in that direction.

It is noted that the filling grooves 27 may be provided with the longitudinal groove portion(s) 37 described above in addition to the oblique groove portions 40. In this case as well, the longitudinal groove portions 37 may be formed only on the both end sides in the longitudinal direction of the supporting block 23, or the longitudinal groove portion 37 may be formed over the entire length in the longitudinal direction of the supporting block 23. By forming the longitudinal groove portion(s) 37 in the supporting block 23, the areas of the side surfaces 28 and the bottom surfaces 29, in the supporting block 23, each contacting the adhesive agent 26 are increased. As a result, the supporting block 23 can increase the adhesion force of the substrate 13.

In addition, in this case as well, the longitudinal groove portions 37 may also be respectively formed as the deep groove portions 33 in the both end portions in the longitudinal direction of the supporting block 23. The longitudinal groove portions 37 are formed as the deep groove portions 33, respectively, thereby making it possible to increase the shear area in each of the deep groove portions 33. Thus, the shear stress more strongly acts on each of the side surfaces 28 of the filling grooves 27. As a result, in the supporting block 23, the adhesion force of the substrate 13 can be further increased in the both end portions on each of which the stress for peeling off the substrate 13 from the supporting block 23 is easy to concentrate.

Now, the filling grooves 27 are formed at the same depth. That is to say, in the filling grooves 27, the transverse groove portions 30 are formed at the same depth. Also, when the longitudinal groove portions 37 are formed in addition to the transverse groove portions 30, the transverse groove portions 30 and the longitudinal groove portions 37 are formed at the same depth. Likewise, in the filling grooves 27, the oblique groove portions 40 are formed at the same depth. Also, when the longitudinal groove portions 37 are formed in addition to the oblique groove portions 40, the oblique groove portions 40 and the longitudinal groove portions 37 are formed at the same depth.

The transverse groove portions 30 and the longitudinal groove portions 37, and the oblique groove portions 40 and the longitudinal groove portions 37 are formed at the same depth in the manner as described above, whereby when each of the filling grooves 27 is filled with the adhesive agent 26, the bubbles become easy to vent through the transverse groove portions 30, and thus the bubbles can be prevented from remaining within the adhesive agent 26. In addition, the filling grooves 27 are formed at the same depth, whereby the adhesive agent 26 becomes easy to uniformly, evenly fill in the filling grooves 27.

In addition, when the deep groove portions 33 are formed, the filling grooves 27 are formed at the same depth except for the deep groove portions 33.

In addition, in the supporting block 23, the adhesion surfaces 25 which are brought into contact with application areas 41 and 42 of the adhesive agent 26, respectively, and the filling grooves 27 each filled with the adhesive agent 26 may be subjected to roughening processing. In the supporting block 23, the adhesion surface 25 to which the adhesive agent 26 is adhered, and the filling grooves 27 each filled with the adhesive agent 26 are roughened, whereby the adhesive agent 26 bites at the rough surfaces, thereby making it possible to further increase the adhesion strength of the substrate 13.

4. Substrate 13

Figure 16:
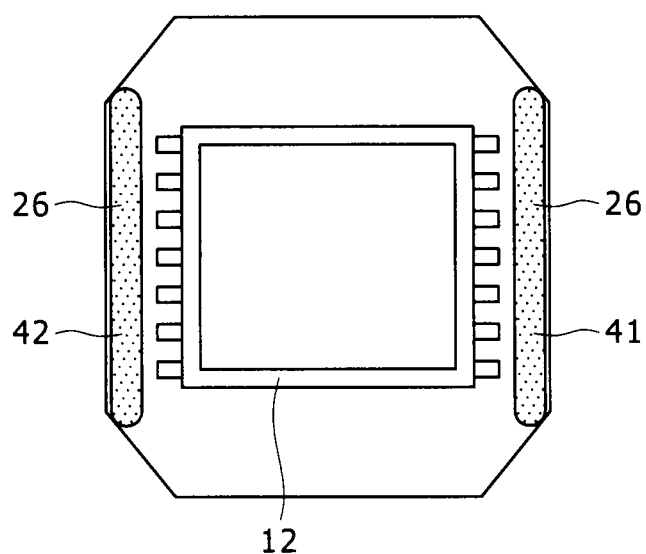
FIG. 16 is a top plan view showing a substrate.

Here, the substrate 13 which is fixed to the supporting block 23 will be described with reference to FIGS. 5 and 16. As shown in FIGS. 5 and 16, the substrate 13 is a rigid substrate having an approximately rectangular shape. Also, the image pickup element 12 such as a CCD or a CMOS is mounted to a front surface of the substrate 13. A terminal portion (not shown) which is connected to a connector or the like to which a harness including cables for signals, a power source and the like is connected is formed on a back surface of the substrate 13. In addition, the substrate 13 is bonded to the supporting block 23 so as to face the image capturing lens 18 of the image capturing lens block 11 with the image pickup element 12 being directed to the image capturing lens block 11. After that, the image capturing lens block 11 bonded to the substrate 13 is fitted to the upper half 15.

The right-hand and left-hand side application areas 41 and 42 paired with each other for the adhesive agent 26 are provided in the opposite substrate side edge portions so as to correspond to the paired supporting blocks 23 erected on the image capturing lens block 11, respectively. The paired application areas 41 and 42 are provided along the side edge portion of the substrate 13 to which any of the parts or components cannot be mounted. For this reason, the paired application areas 41 and 42 can be provided in the substrate 13 by effectively utilizing a limited space while a mounting area for the image pickup element 12 and other electronic components is ensured, and thus it is possible to suppress an increase in size of the substrate 13 and therefore an increase in size of the camera apparatus 1.

In the substrate 13 in which a predetermined wiring pattern is formed and to which the electronic components such as the image pickup element 12 are mounted, the adhesive agent 26 is applied to each of the paired application areas 41 and 42, and the application areas 41 and 42 are placed on the adhesion surfaces 25 of the supporting blocks 23 each erected on the image capturing lens block 11. An ultraviolet curable adhesive agent or a thermosetting adhesive agent, for example, is used as the adhesive agent 26 which is applied to each of the application areas 41 and 42.

After the adhesive agent 26 applied to each of the paired application areas 41 and 42 of the substrate 13, the paired application areas 41 and 42 are placed on the adhesion surfaces 25 of the supporting blocks 23, respectively. Also, after the image capturing lens 18 fitted to the image capturing lens block 11, and the image pickup element 12 mounted to the substrate 13 are aligned with each other, and the adhesive agent 26 is cured by radiation or the like of the ultraviolet light to be temporarily fixed to the supporting block 23, the thermosetting resin is cured by heating in a heating furnace, thereby bonding the substrate 13 to the supporting block 23. After that, the upper half 15 in which the image capturing lens block 11 and the substrate 13 are disposed is coupled to the lower half 16, thereby forming the housing 10.

At this time, the adhesive agent 26 applied to each of the paired application areas 41 and 42 of the substrate 13 is filled in each of the filling grooves 27 of the supporting block 23 erected on the image capturing lens block 11. Therefore, when the external force for peeling off the substrate 13 from the supporting block 23 acts on the substrate 13, as shown in FIG. 8, the shear stress, s, acts on each of the side surfaces 28 of the filling grooves 27, and also the tension stress, t, against the peeling-off acts between each of the bottom surfaces 29 of the filling grooves 27, and the supporting block 23. In such a manner, not only the tension stress, t, against the peeling-off acts between each of the bottom surfaces 29 of the filling grooves 27, and the supporting block 23, but also the shear stress, s, acts on each of the side surfaces 28 of the filling grooves 27, whereby the supporting block 23 can strengthen the adhesion force of the substrate 13. As a result, the substrate 13 and the supporting block 23 form the paired application areas together over the entire circumference of the substrate 13, and also have the adhesion strength equal to or larger than that in the case where the substrate 13 is bonded to the supporting block 23 having the smooth adhesion surface 25. Therefore, even when the camera apparatus 1 is exposed to the high-temperature environment, the adhesion strength of the substrate 13 can be maintained, and thus the substrate 13 can be prevented from being peeled off from the supporting block 23.

According to such a camera apparatus 1, since the paired application areas 41 and 42 to each of which the adhesive agent 26 is applied are provided along the opposite side edge portions of the substrate 13. Thus, by effectively utilizing the area to which any of the parts or components cannot be mounted, the substrate 13 can be miniaturized while the mounting area for the image pickup element 12 and other electronic components is maintained. In addition, in the camera apparatus 1, the housing 10 can be miniaturized along with the miniaturization of the substrate 13. Also, even by providing the paired application areas 41 and 42 for the adhesive agent 26 only in the opposite paired outer edge portions of the substrate 13, respectively, the adhesion strength of the substrate 13 can be maintained, and thus the substrate 13 can be prevented from being peeled off from the supporting block 23.

It is noted that in the substrate 13, the ultraviolet curable adhesive agent may be applied so as to correspond to the area in which only the transverse groove portions 30 are provided, and the thermosetting adhesive agent may be applied so as to correspond to the area in which the transverse groove portions 30 and the longitudinal groove portions 37 are both provided. As a result, when the substrate 13 is temporarily fixed to the supporting block 23, the ultraviolet light can be radiated along each of the transverse groove portions 30. Since each of the transverse groove portions 30 is straightly formed in the width direction of the supporting block 23 and a length thereof is short, the adhesive agent can be readily cured by the radiation of the ultraviolet light. On the other hand, although there is the possibility that in the substrate 13, the ultraviolet light does not sufficiently reach the adhesive agent 26 filled in the longitudinal groove portion(s) 37, by using the thermosetting adhesive agent for the longitudinal groove portion(s) 37, the thermosetting adhesive agent can be sufficiently cured by the heating.

Likewise, the ultraviolet curable adhesive agent may be applied so as to correspond to the area in which only the oblique groove portions 40 are provided, and the thermosetting adhesive agent may be applied so as to correspond to the area in which the oblique groove portions 40 and the longitudinal groove portions 37 are both provided.

Figure 17A:
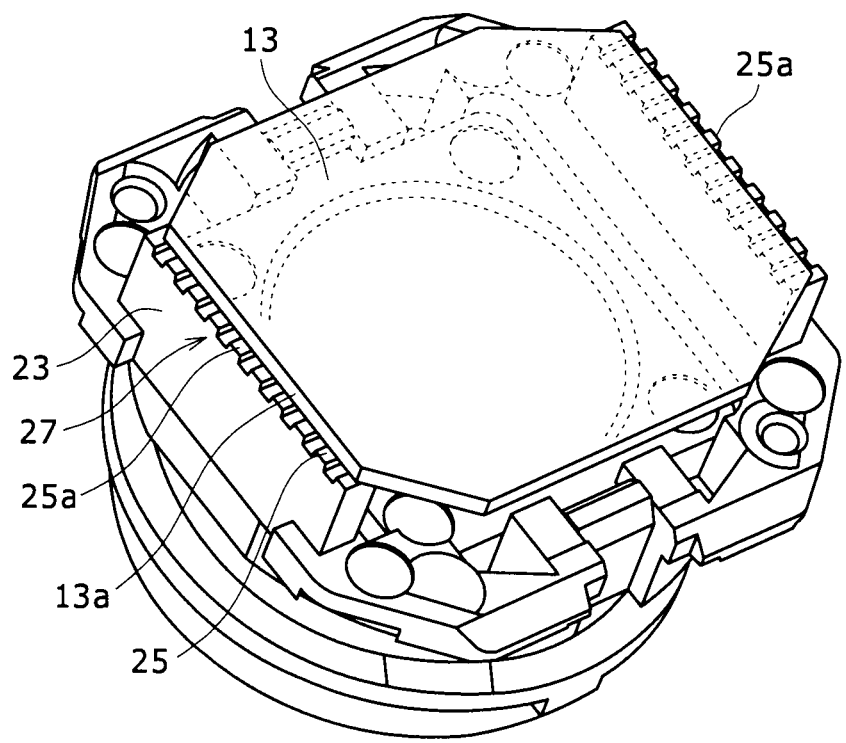
FIGS. 17A and 17B are respectively a transmissive perspective view showing a first change of the substrate in which the substrate is bonded to adhesion surfaces of the supporting blocks so as to cross the adhesion surfaces of the supporting blocks, and a partial side elevational view showing the substrate shown in FIG. 17A.
Figure 17B:
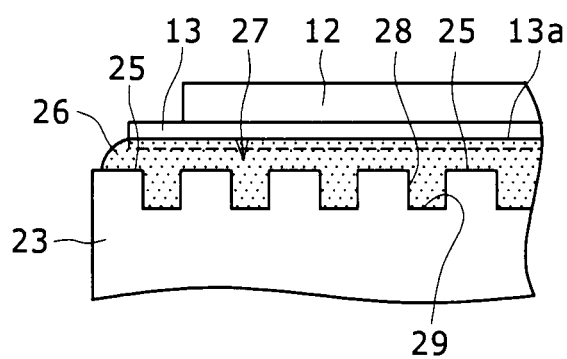

In addition, in the camera apparatus 1 according to the embodiment of the present invention, as shown in FIG. 17A, the paired outer edges in which the paired application areas 41 and 42 of the substrate 13 are provided, respectively, may be formed in such a way that they are located on the more inside than outer edges 25a of the adhesion surfaces 25 of the supporting block 23, and are placed on the adhesion surfaces 25 so as to cross the adhesion surfaces 25 in the longitudinal direction of the supporting blocks 23. Those paired outer edges are placed on the adhesion surfaces 25, respectively, so as to cross the adhesion surfaces 25 of the supporting blocks 23, whereby as shown in FIG. 17B, the adhesive agent 26 applied to each of the paired application areas 41 and 42 is also applied from the adhesion surfaces 25 of the supporting blocks 23 to a side surface 13a of the substrate 13. As a result, in the substrate 13, the application areas of the adhesive agent 26 applied between each of the supporting blocks 23, and the substrate 13 is increased, and thus the adhesion strength by the adhesive agent 26 is increased. In addition, each of the sided surfaces 13a to which the adhesive agent 26 is applied is cut into a predetermined shape to be roughened. As a result, the application of the adhesive agent 26 to each of the side surfaces 13a of the substrate 13 increases the adhesion strength by the adhesive agent 26 between each of the supporting blocks 23, and the substrate 13.

Figure 18:
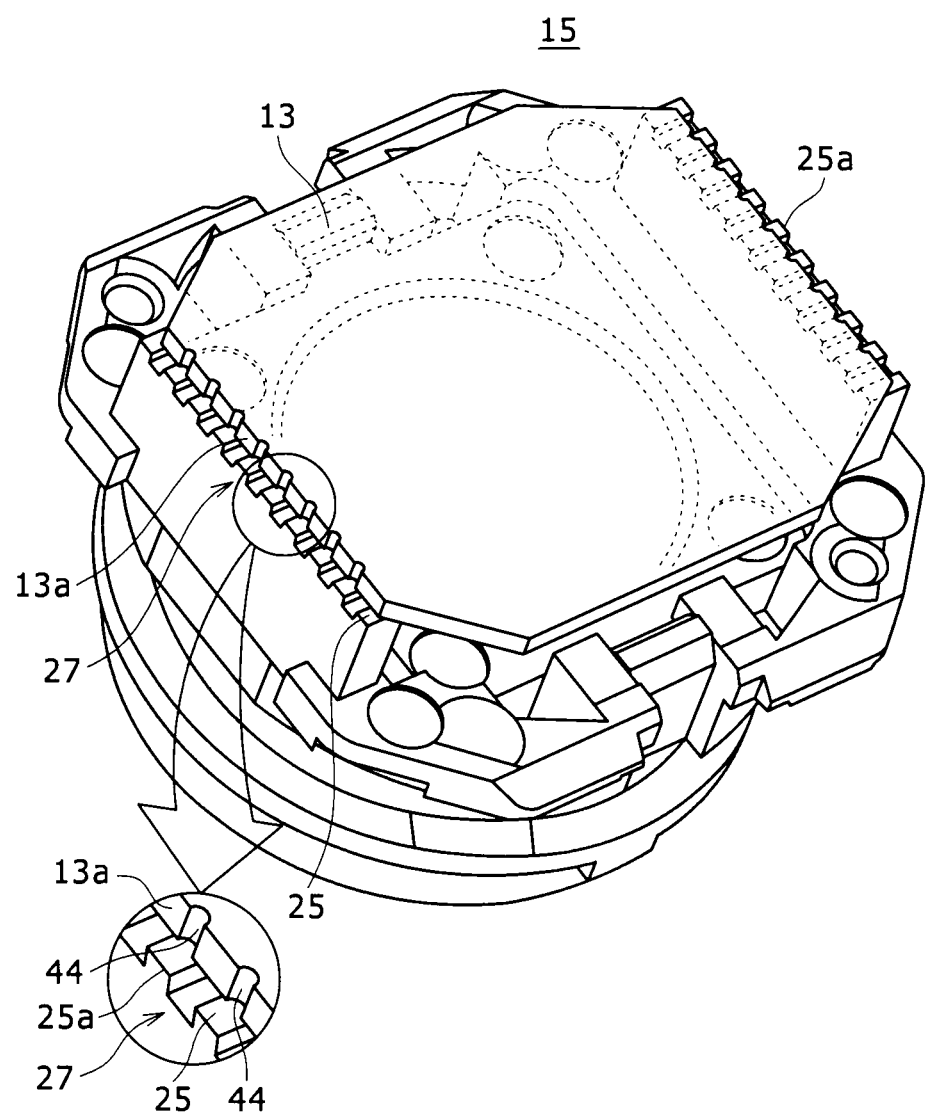
FIG. 18 is a perspective view showing a second change of the substrate in which the substrate is bonded to adhesion surfaces of the supporting blocks so as to cross the adhesion surfaces of the supporting blocks.

In addition, in the camera apparatus 1, as shown in FIG. 18, a circular recess portion 44 may be formed in each of the side edge portions in which the paired application areas 41 and 42 of the substrate 13 are formed, respectively. A plurality of circular recess portions 44 are formed in each of the side edge portions in which the paired application areas 41 and 42 of the substrate 13 are formed, respectively. Thus, the substrate 13 is placed on the adhesion surfaces 25 of the supporting blocks 23, whereby the circular recess portions 44 are located either on the adhesion surfaces 25 or on the filling grooves 27. Therefore, in the substrate 13, the adhesive agent 26 applied to each of the paired application areas 41 and 42 is filled from each adhesion surface 25 and each filling groove 27 of each supporting block 23 to each circular recess portion 44. The circular recess portions 44 are formed by utilizing a method in which after drill-holes are formed in predetermined portions of a work having a plurality of substrates 13 formed therein by using a drill or the like, the work is cut off so as to divide the drill-holes, and so forth. Also, as described above, the side surfaces 13a of the substrate 13 composing the circular recess portions 44 are each roughened. Therefore, in the substrate 13, the adhesive agent 26 is applied to each of the circular recess portions 44, thereby increasing the application area of the adhesive agent 26. Also, the adhesive agent 26 is also applied to each of the side surfaces 13a roughened, thereby increasing the adhesion strength between each of the supporting blocks 23, and the substrate 13.

It is noted that although in the camera apparatus 1, the housing 10 is formed into the approximately rectangular shape, the housing 10, for example, may also be formed into a cylindrical shape instead. In this case, the substrate 13 is also formed into a disc-like shape so as to correspond to the cylindrical shape of the housing 10, and also the supporting blocks 23 for supporting the side edge portions of the substrate 13 are each erected on the image capturing lens block 11 in a circular arc style.

In addition, in the camera apparatus 1, not only the housing 10 and the image capturing lens block 11 may be formed separately from each other, but also a construction corresponding to the image capturing lens block 11 may be formed integrally with the upper half 15. In the latter case, the image capturing lens 18 is incorporated in the upper half 15, and each of the supporting blocks 23 is integrally molded. Also, the substrate 13 is bonded to each of the supporting blocks 23 erected on the image capturing lens block 11, that is, on the upper half 15.

Next, a construction A is set in such a way that the filling grooves 27 composed of only the transverse groove portions 30 are formed in each of the adhesion surfaces 25 of the supporting blocks 23 (refer to FIGS. 7 and 9). A construction B is set in such a way that the filling grooves 27 composed of the transverse groove portion 30, the longitudinal groove portion 37 formed over the entire length in the longitudinal direction of the supporting block 23, and the deep groove portions 33 are formed in each of the adhesion surfaces 25 of the supporting blocks 23 (refer to FIGS. 13A and 13B). Also, a construction C is set in such a way that none of the filling grooves 27 is formed in each of the supporting blocks 23, and each of the adhesion surfaces 25 is flattened. Here, a description will be given with respect to a change of the adhesion strength following a change of the temperature environment when the substrates 13 are bonded to the constructions A, B and C, respectively.

This adhesion strength test was carried out as follows. That is to say, after the substrates 13 were bonded and fixed to the supporting blocks 23 of the constructions A, B and C, respectively, forces obtained when the constructions A, B and C were exposed to the temperature environment of −40° C., and the temperature environment of 100° C., and in this state, the substrates 13 were peeled off from the supporting blocks 23 of the constructions A, B and C, respectively, were measured with a push-pull gauge. The measurement results are shown in Table 1.

TABLE 1

|  | Air temperature | |
| --- | --- | --- |
|  | −40° C. | 100° C. |
| Construction A | 100% | 87% |
| Construction B | 100% | 105% |
| Construction C | 100% | 54% |

As shown in Table 1, when the adhesion strength of each of the construction A, the construction B and the construction C at −40° C. is set as 100%, while under the temperature environment of 100° C., the adhesion strength in the construction C is reduced to 54%, the adhesion strength in the construction A remains at a reduction of 13%, and the adhesion strength in the construction B is slightly increased to 105% and thus is not substantially changed. It is noted that it is estimated that an increase of 5% in adhesion strength is caused by a measurement error.

As understood from this adhesion strength test, by providing the filling grooves 27 in each of the adhesion surfaces 25 of the supporting blocks 23, the adhesion strength can be further increased as compared with the case of the construction C in which none of the filling grooves 27 is formed in each of the supporting blocks 23. In addition, it is understood from Table 1 that since the adhesion strength is larger in the construction B than in the construction A, the adhesion force is increased in the filling grooves 27 having both the longitudinal groove portion 37 and the deep groove portions 33 provided therein rather than in the filling grooves 27 composed of only the transverse groove portions 30. Thus, the adhesion force is increased in proportion to the area of the side surfaces 28.

In addition, not only the camera apparatus 1 is used as the on-board camera, but also the camera apparatus 1, for example, can be applied to a security camera, an entry phone camera or the like. In the latter case as well, the housing 10 is miniaturized along with the miniaturization of the substrate 13, thereby making it possible to widely cope with all the installation conditions.

The present application contains subject matter related to that disclosed in Japanese Priority Patent Application JP 2009-182596 filed in the Japan Patent Office on Aug. 5, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A camera apparatus, comprising:
   a lens block having an image capturing lens provided therein;
   a substrate having an image pickup element mounted thereto;
   a housing for accommodating therein said lens block and said substrate; and
   a supporting block for supporting said substrate so that said image pickup element and said image capturing lens face each other by bonding thereto said substrate by using an adhesive agent, wherein said supporting block has a plurality of side surfaces, each making a right angle with a respective adhesion surface to which said substrate is bonded, and a bottom surface parallel with said adhesion surfaces, and a filling groove which is filled with said adhesive agent is formed in said supporting block between said side surfaces and extending across an entirety of a whole width of the supporting block, the width of the supporting block being perpendicular to a longitudinal direction of the supporting block, wherein
   the supporting block includes a deep groove portion formed more deeply than the filling groove and formed in an end portion in the longitudinal direction of the supporting block.

2. The camera apparatus according to claim 1, wherein filling grooves are formed at the same depth as each other.

3. The camera apparatus according to claim 1, wherein said substrate is bonded on a more inside portion than an outer edge of one of said adhesion surfaces.

4. The camera apparatus according to claim 1, wherein supporting blocks paired with each other are provided opposite to each other, and outer edge portions of opposite two sides of said substrate are bonded to the supporting blocks paired with each other, respectively.

5. A camera apparatus, comprising:
   a lens block having an image capturing lens provided therein;
   a substrate having an image pickup element mounted thereto;
   a housing for accommodating therein said lens block and said substrate; and
   a supporting block for supporting said substrate so that said image pickup element and said image capturing lens face each other by bonding thereto said substrate by using an adhesive agent, wherein said supporting block has a side surface making a right angle with an adhesion surface to which said substrate is bonded, and a bottom surface parallel with said adhesion surface on said adhesion surface, and a filling groove which is filled with said adhesive agent is formed in said supporting block, and, with regard to said filling groove, a plurality of transverse groove portions each making a right angle with a longitudinal direction of said supporting block are provided in the longitudinal direction of said supporting block.

6. The camera apparatus according to claim 5, wherein, with regard to said filling groove, a deep groove portion formed more deeply than each of other places is formed in a portion on which an external force for peeling off said substrate from said adhesion surface is concentrated.

7. The camera apparatus according to claim 6, wherein deep groove portions are respectively formed in end portions in the longitudinal direction of said supporting block for supporting an end edge portion of said substrate.

8. The camera apparatus according to claim 7, wherein, with regard to said filling groove, a longitudinal groove portion making a right angle with each of said plurality of transverse groove portions is provided.

9. The camera apparatus according to claim 8, wherein longitudinal groove portions are respectively formed in end portions in the longitudinal direction of said supporting block.

10. The camera apparatus according to claim 8, wherein said longitudinal groove portion is continuously formed along the longitudinal direction of said supporting block.

11. The camera apparatus according to claim 6, wherein filling grooves are formed at the same depth except for said deep groove portion.

12. A camera apparatus, comprising:
a lens block having an image capturing lens provided therein;
a substrate having an image pickup element mounted thereto;
a housing for accommodating therein said lens block and said substrate; and
a supporting block for supporting said substrate so that said image pickup element and said image capturing lens face each other by bonding thereto said substrate by using an adhesive agent, wherein said supporting block has a side surface making a right angle with an adhesion surface to which said substrate is bonded, and a bottom surface parallel with said adhesion surface on said adhesion surface, and a filling groove which is filled with said adhesive agent is formed in said supporting block, and,
with regard to said filling groove, a plurality of oblique groove portions each extending obliquely with respect to the longitudinal direction of said supporting block are provided along the longitudinal direction of said supporting block.

13. The camera apparatus according to claim 12, wherein, in said housing, supporting blocks paired with each other are provided opposite to each other; and
said oblique groove portions each extend obliquely in a direction opposite to an inclined direction with respect to the longitudinal direction of said supporting block of said oblique groove portions provided in the supporting block opposite to said supporting block.

14. A camera apparatus, comprising:
a lens block having an image capturing lens provided therein;
a substrate having an image pickup element mounted thereto;
a housing for accommodating therein said lens block and said substrate; and
a supporting block for supporting said substrate so that said image pickup element and said image capturing lens face each other by bonding thereto said substrate by using an adhesive agent, wherein said supporting block has a side surface making a right angle with an adhesion surface to which said substrate is bonded, and a bottom surface parallel with said adhesion surface on said adhesion surface, and a filling groove which is filled with said adhesive agent is formed in said supporting block, and,
with regard to said filling groove, a plurality of transverse groove portions each making a right angle with a longitudinal direction of said supporting block are provided in an area in which an ultraviolet curable adhesive agent is filled as said adhesive agent in the longitudinal direction of said supporting block, and
said plurality of transverse groove portions, and a longitudinal groove portion making a right angle with each of said plurality of transverse groove portions are provided in an area in which a thermosetting adhesive agent is filled as said adhesive agent.

15. A camera apparatus, comprising:
a lens block having an image capturing lens provided therein;
a substrate having an image pickup element mounted thereto;
a housing for accommodating therein said lens block and said substrate; and
a supporting block for supporting said substrate so that said image pickup element and said image capturing lens face each other by bonding thereto said substrate by using an adhesive agent, wherein said supporting block has a side surface making a right angle with an adhesion surface to which said substrate is bonded, and a bottom surface parallel with said adhesion surface on said adhesion surface, and a filling groove which is filled with said adhesive agent is formed in said supporting block, and,
with regard to said filling groove, a plurality of oblique groove portions each extending obliquely with respect to a longitudinal direction of said supporting block are provided in an area in which an ultraviolet curable adhesive agent is filled as said adhesive agent in the longitudinal direction of said supporting block, and
a longitudinal groove portion parallel with the longitudinal direction of said supporting block, and a plurality of oblique groove portions each extending obliquely with respect to said longitudinal groove portion are provided in an area in which a thermosetting adhesive agent is filled as said adhesive agent.

16. A camera apparatus, comprising:
an image capturing lens;
a substrate having an image pickup element mounted thereto;
a housing for accommodating therein said substrate, said image capturing lens being incorporated in said housing; and
a supporting block for supporting said substrate so that said image pickup element and said image capturing lens face each other by bonding thereto said substrate by using an adhesive agent, said supporting block being formed in said housing, wherein said supporting block has a plurality of side surfaces, each making a right angle with a respective adhesion surface to which said substrate is bonded, and a bottom surface parallel with said adhesion surfaces, and a filling groove which is filled with said adhesive agent is formed in said supporting block between said side surfaces and extending across an entirety of a whole width of the supporting block, the width of the supporting block being perpendicular to a longitudinal direction of the supporting block, wherein
the supporting block includes a deep groove portion formed more deeply than the filling groove and formed in an end portion in the longitudinal direction of the supporting block.

* * * * *